Figure 1:
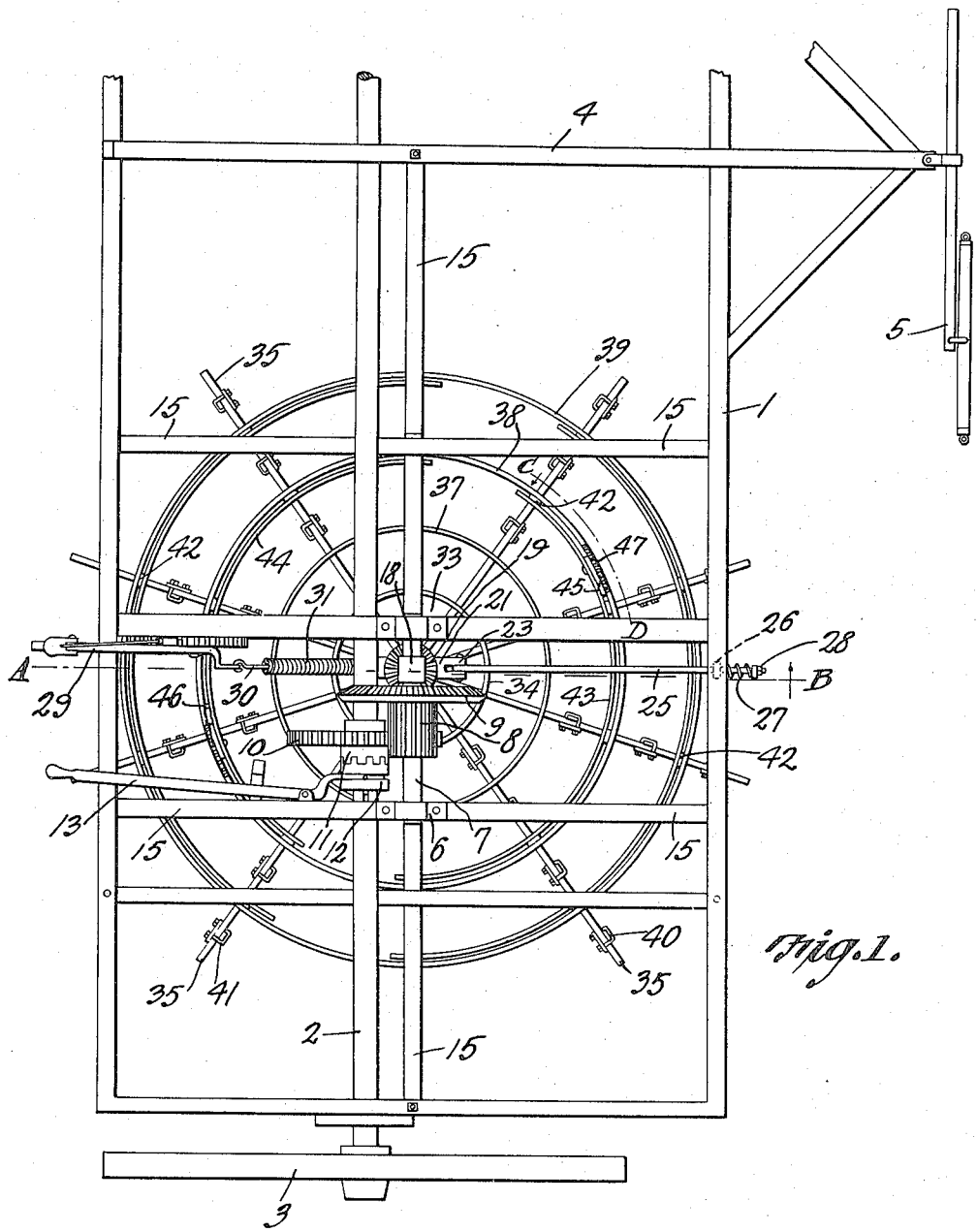

J. W. LEWIS.
HARROW.
APPLICATION FILED APR. 17, 1915.

1,157,706.

Patented Oct. 26, 1915.
3 SHEETS—SHEET 1.

Witnesses
J. P. Tomlin
R. L. Parker

J. W. Lewis  Inventor
by  C. A. Snow & Co.
Attorneys

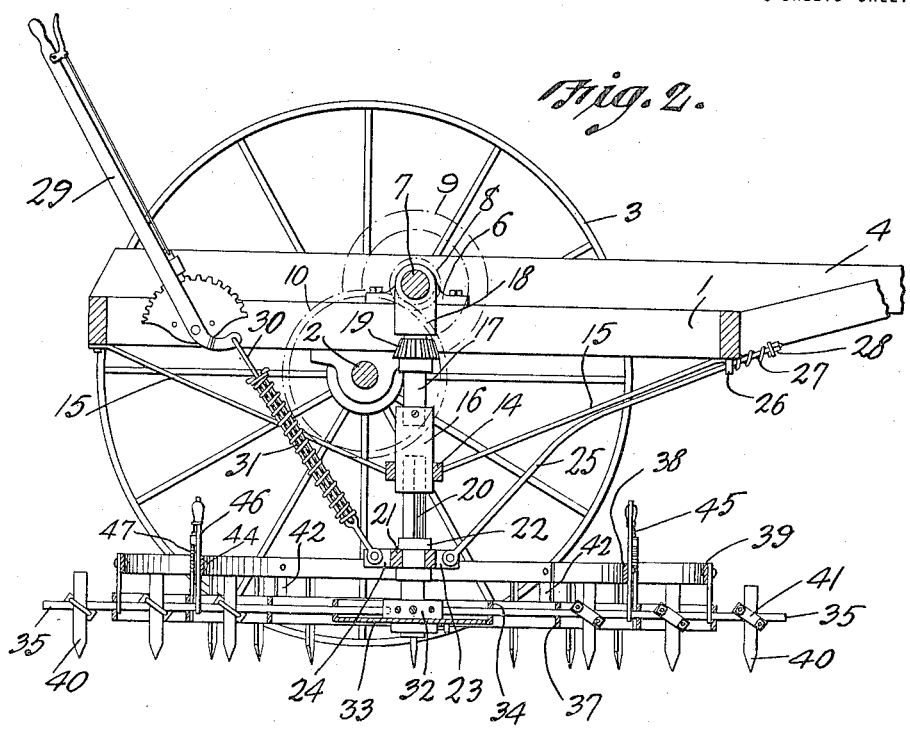

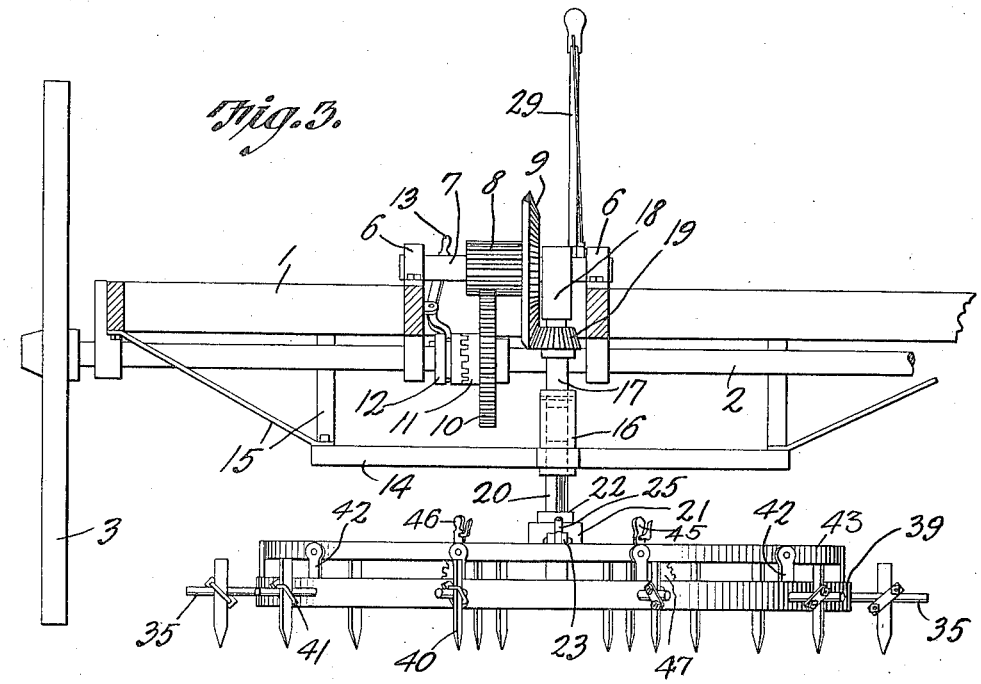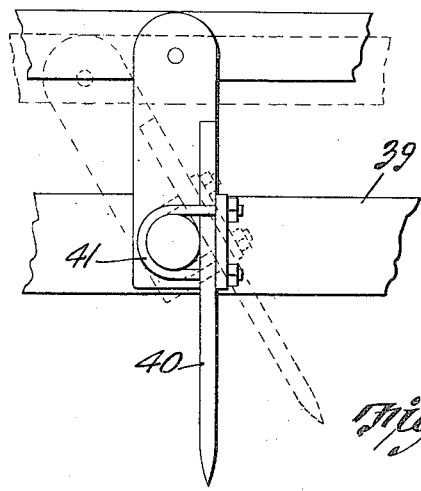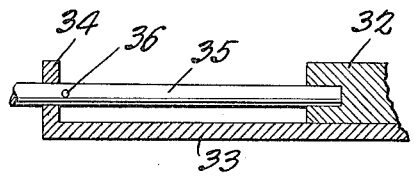

UNITED STATES PATENT OFFICE.

JAMES WILLIAM LEWIS, OF DENTON, MONTANA.

HARROW.

1,157,706.                 Specification of Letters Patent.        Patented Oct. 26, 1915.

Application filed April 17, 1915. Serial No. 22,152.

*To all whom it may concern:*

Be it known that I, JAMES WILLIAM LEWIS, a citizen of the United States, residing at Denton, in the county of Fergus and State of Montana, have invented a new and useful Harrow, of which the following is a specification.

This invention relates to harrows, one of its objects being to provide a harrow having one or more revoluble structures each of which is provided with series of teeth, there being means combined with each of said revoluble structures for adjusting the teeth angularly so as to give them any desired pitch.

A further object is to provide a tooth carrying structure which is simple and durable in construction, and which has simple mechanism for rotating it.

Another object is to provide means whereby the teeth carrying structure can be raised and lowered, thus to move it out of or into engagement with the soil.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a harrow and shows one of the revoluble sections and its operating mechanism. Fig. 2 is a section on line A—B Fig. 1. Fig. 3 is a front elevation of the revoluble section and its operating mechanism, the adjacent portion of the harrow frame being shown in section. Fig. 4 is an enlarged section on line C—D Fig. 1. Fig. 5 is an enlarged elevation of a portion of the revoluble section. Fig. 6 is an enlarged section through a portion of the hub and the disk used in connection therewith.

Referring to the figures by characters of reference 1 designates a frame of any suitable size and proportions, the same having a revoluble axle 2 supported by wheels, one of which has been indicated at 3. Thus it will be seen that during the forward movement of the machine the axle will be rotated by the wheels 3 and can thus be used as a drive element. The machine may be propelled in any suitable manner. In the drawings one half of a machine has been illustrated, the same being provided with a forwardly extending tongue 4 to which a whiffle tree 5 is connected. In a machine of the type illustrated two ground engaging or harrow sections are employed but for the purposes of illustration, only one of these sections has been shown. It is to be understood, however, that a machine having but a single harrow section can be used or, if preferred, a machine having three or more sections may be used.

In the structure illustrated, the frame 1 has bearings 6 in which is journaled a shaft 7 carrying a gear 8 and a bevel pinion 9. Gear 8 is constantly in mesh with a gear 10 which is loose on the axle 2 and has a clutch member 11 connected thereto or formed therewith. Another clutch member 12 is feathered on the axle 2 and is adapted to be actuated by means of a lever 13, thus to be shifted into or out of engagement with the clutch member 11 so as to couple gear 10 to or uncouple it from the axle 2. When the gear 10 is uncoupled from the axle it will of course be apparent that motion will not be transmitted therethrough from the axle 2 to the gear 8. When, however, said gear 10 is coupled to the axle 2, motion will be transmitted from axle 2 to the gear 8.

Suspended under the frame 1 is a beam 14 held rigidly connected to said frame 1 in any suitable manner, as by means of downwardly converging hangers 15. Journaled within the beam 14 is a tubular extension 16 of a shaft 17 the upper end portion of which is journaled within a bearing 18 supported by shaft 7, this shaft 17 having a bevel pinion 19 which constantly meshes with the bearing 18. The extension 16 has an angular bore and this bore is slidably engaged by an angular shaft 20 extending upwardly through a block 21, there being a collar 22 on the shaft 20 to limit the downward movement of said shaft relative to the block. The block 21 is provided with ears 23 extending forwardly therefrom and with additional ears 24 extending rearwardly. To the ears 23 is pivotally connected a rod 25 which projects upwardy and forwardly and is slidably mounted within a bracket 26 depending from the front portion of frame 1, there being a cushioning spring 27 on that portion of the rod 25 in front of the bracket 26, a nut 28 being provided for varying the tension of the spring. A lever 29 is pivotally mounted on the rear portion of frame 1 and the lower arm of this lever is connected by rods 30 to the ears 24, said rods being slidably connected and having a spring 31 which constitutes a cushion whereby when lever 29 is shifted in one direction, a yielding pull will be exerted upwardly upon the block 21 while, when the lever is locked in one position with the block 21 lowered, any upward thrust upon the block will be resisted by the spring 31.

By utilizing the lever 29 and the rods 30 and 25, the shaft 20 can be readily raised and lowered relative to the surface of the ground.

Secured to the lower end of shaft 20 is a hub 32 arranged at the center of a disk 33 provided with an upstanding marginal flange 34. Journaled at their inner ends within the peripheral portion of the hub 32 are radial arms 35 extending through the flange 34. These arms are held against withdrawal from the hub 32 by pins 36 or other suitable means engaging the arms close to the inner side of the flange 34. Arms 35 project any desired distances beyond the hub 32 and are journaled within concentric rings 37, 38 and 39. The arms constitute the sole supports for the rings and the rings constitute means for holding the outer end portions of the arms properly spaced. Secured to each of the arms 35 are soil engaging elements which may be in the form of harrow teeth 40 held to the arms by clips 41 of any preferred construction. Each arm 35 is also provided with an upwardly extending finger 42.

The radial arms 35 are arranged in opposed series and all of the fingers 42 of one series are pivotally engaged by a connecting strip 43, while the fingers 42 of the other series are pivotally engaged by a connecting strip 44. Pivotally mounted upon the ring 38 are adjusting levers 45 and 46, the two levers being similar and each being provided with a toothed segment 47 secured to the ring 38 whereby the lever may be locked in any position to which it is adjusted. Lever 45 is pivotally connected to the strip 43, while lever 46 is pivotally connected to the strip 44. The levers 45 and 46 are comparatively short so that they will not seriously limit the vertical adjustment of the shaft 20 by coming into contact with beam 14.

It will be apparent that by means of the levers 45 and 46, the arms 35 of either or both series can be adjusted angularly, thus to bring the teeth 40 to any desired angles relative to the surface of the ground. After the adjustment has been effected, the harrow section made up of the hub 32 and the concentric rings can be lowered by means of lever 29, thus to bring the points of the teeth into contact with the ground. By means of lever 13, the gear 10 can be coupled to the rotating axle 2 so that motion will thus be transmitted from the axle through the gear to the depending shaft 20 with the result that the harrow section will be rotated rapidly during the forward movement of the machine and the soil quickly and effectively pulverized. When the harrow section is raised the rod 25 will thrust upwardly through the bracket 26, while shaft 20 will slide upwardly within the sleeve 16.

During the forward movement of the machine the rod 25 and its spring 27 constitute bracing means to reinforce shaft 20.

What is claimed is:—

1. In a harrow, a shaft, radial arms, concentric rings supported by the arms and constituting spacing means, soil engaging devices fixedly connected to the respective arms, said arms being disposed in series, arcuate connections between the arms of each series, and means revoluble with the shaft for operating the respective connections to rotate the arms of each series simultaneously, thereby to adjust the soil engaging devices angularly.

2. In a harrow, the combination with a wheel supported structure, a telescopic shaft depending therefrom, and means for transmitting motion to said shaft from one of the supporting wheels, of a harrow section revoluble with the shaft and including radial arms, concentric rings supported by the arms and constituting spacing means, soil engaging devices fixedly connected to the respective arms, said arms being disposed in series, connections between the arms of each series, and means for operating the respective connections for rotating the arms of each series simultaneously thereby to adjust the soil engaging devices angularly.

3. In a harrow, the combination with a wheel supported structure, a telescopic shaft depending therefrom, means for transmitting motion to the shaft from one of the supporting wheels, and means for adjusting the shaft longitudinally during its rotation, of a harrow section carried by the shaft and including a hub, revoluble arms radiating therefrom, concentric rings carried by the arms and constituting spacing means, soil engaging elements connected to and movable with the arms, said arms being arranged in series, connections between the arms of each series, and separate means for actuating the respective connections to adjust the soil engaging elements angularly.

4. In a harrow, a revoluble section including a hub, a flanged disk concentric therewith and secured thereto, radial arms journaled within the flanged disk and hub, means for engaging the arms for holding them against withdrawal from the hub and disk, concentric rings supported by the arms and constituting spacing means, soil engaging elements secured to and movable with the arms, said arms being arranged in series, connections between the arms of each series, and means for simultaneously rotating the arms of each series thereby to adjust the soil engaging elements angularly.

In testimony that I claim the foregoing as my own, I have hereto affixed my signature in the presence of witnesses.

JAMES WILLIAM LEWIS.

Witnesses:
S. W. MacGibbon,
O. A. Bergeson,
G. M. Norcutt.

Copies of this patent may be obtained for five cents each, by addressing the "Commissioner of Patents. Washington, D. C."